United States Patent
Sato et al.

(10) Patent No.: US 11,359,108 B2
(45) Date of Patent: Jun. 14, 2022

(54) INK SET

(71) Applicant: SAKATA INX CORPORATION, Osaka (JP)

(72) Inventors: Yoichi Sato, Osaka (JP); Hiroyuki Konishi, Osaka (JP); Kazuki Moriyasu, Osaka (JP)

(73) Assignee: SAKATA INX CORPORATION, Osaka (JP)

(*) Notice: Subject to any disclaimer, the term of this patent is extended or adjusted under 35 U.S.C. 154(b) by 299 days.

(21) Appl. No.: 16/753,315

(22) PCT Filed: Oct. 15, 2018

(86) PCT No.: PCT/JP2018/038247
§ 371 (c)(1),
(2) Date: Apr. 2, 2020

(87) PCT Pub. No.: WO2019/078136
PCT Pub. Date: Apr. 25, 2019

(65) Prior Publication Data
US 2020/0239721 A1    Jul. 30, 2020

(30) Foreign Application Priority Data
Oct. 16, 2017 (JP) .................. 2017-199997

(51) Int. Cl.
| | |
|---|---|
| C09D 11/54 | (2014.01) |
| B41M 5/00 | (2006.01) |
| C09C 1/56 | (2006.01) |
| C09C 3/10 | (2006.01) |
| C09D 11/324 | (2014.01) |

(52) U.S. Cl.
CPC ........... *C09D 11/54* (2013.01); *B41M 5/0023* (2013.01); *C09C 1/56* (2013.01); *C09C 3/10* (2013.01); *C09D 11/324* (2013.01)

(58) Field of Classification Search
CPC ... C09D 11/326; C09D 11/033; C09D 11/107; C09D 11/322; C09D 11/037
USPC ....................................... 523/160
See application file for complete search history.

(56) References Cited

U.S. PATENT DOCUMENTS

| | | | | |
|---|---|---|---|---|
| 2002/0077384 A1* | 6/2002 | Sano | ............. | C09D 11/32 523/160 |
| 2012/0200651 A1* | 8/2012 | Sasada | ............. | C09D 11/40 522/182 |
| 2017/0002216 A1 | 1/2017 | Sato et al. | | |
| 2017/0362452 A1 | 12/2017 | Yasuda et al. | | |
| 2019/0161633 A1 | 5/2019 | Sato et al. | | |

FOREIGN PATENT DOCUMENTS

| | | | |
|---|---|---|---|
| CN | 105916948 A | | 8/2016 |
| EP | 2505623 A1 | | 10/2012 |
| JP | 2001-234109 | * | 9/2001 |
| JP | 2009190232 A | | 8/2009 |
| JP | 2009190379 A | | 8/2009 |
| JP | 4964165 B2 | | 6/2012 |
| JP | 2013112701 A | | 6/2013 |
| JP | 2013185136 A | | 9/2013 |
| JP | 2016203470 A | | 12/2016 |
| JP | 2017088646 A | | 5/2017 |
| JP | 2017110185 A | | 6/2017 |
| WO | 2015111644 A1 | | 7/2015 |
| WO | 2016159054 A1 | | 10/2016 |
| WO | 2017145882 A1 | | 8/2017 |
| WO | 2018016141 A1 | | 1/2018 |

OTHER PUBLICATIONS

Machine translation of JP 2001-234109 (Year: 2001).*
Extended European Search Report (EESR) dated Jun. 11, 2021, issued for European counterpart patent application No. EP18868816.2 (6 pages).
Notification Concerning Transmittal of International Preliminary Report on Patentability (PCT/IB/326) and Notification of Transmittal of Translation of the International Preliminary Report on Patentability (PCT/IB/338) dated Apr. 30, 2020, with International Preliminary Report on Patentability (PCT/IB/373) and Written Opinion of the International Searching Authority (PCT/ISA/237), for corresponding international application PCT/JP2018/038247 (13 pages).
International Search Report (ISR) dated Dec. 4, 2018, issued for International application No. PCT/JP2018/038247. (2 pages).
A First Office Action issued by the State Intellectual Property Office of China dated Dec. 21, 2021, for Chinese counterpart application No. 201880065457.7 (7 pages).

* cited by examiner

*Primary Examiner* — Doris L Lee
(74) *Attorney, Agent, or Firm* — Law Office of Katsuhiro Arai

(57) ABSTRACT

An object is to improve the dispersion stability and discharge stability, while also improving the image quality and various resistance properties of printed matters even when the cohesion promoter contained in the primer ink is small in quantity. As a means to achieve the object, an ink set is provided that comprises: an aqueous inkjet ink composition containing (a) a pigment, (b) a water-soluble organic solvent, (c) water, and (d) a resin emulsion, wherein the pigment (a) has a crosslinked resin layer on its surface; and a primer ink composition containing a cohesion promoter that promotes cohesion of the aforementioned ink composition.

20 Claims, No Drawings

INK SET

CROSS-REFERENCE TO RELATED APPLICATIONS

This application is the U.S. National Phase under 35 U.S.C. § 371 of International Application PCT/JP2018/038247, filed Oct. 15, 2018, which claims priority to Japanese Patent Application No. JP2017-199997, filed Oct. 16, 2017. The International Application was published under PCT Article 21(2) in a language other than English.

TECHNICAL FIELD

The present invention relates to an inkjet printing ink set.

BACKGROUND ART

As described in Patent Literature 1, ink sets are known that each comprise: an ink composition which is a polymer-coated pigment containing (a) a pigment, (b) a water-soluble organic solvent, (c) water, and (d) fine resin grains, wherein the pigment (a) is obtained through a step to disperse a pigment using a water-soluble dispersant and then crosslink the dispersed pigment using a crosslinking agent; and a colorless ink composition containing a cohesion promoter that promotes cohesion of the aforementioned ink composition.

However, these aqueous inkjet inks demonstrate poor dispersion stability and discharge stability depending on the types of solvent and resin emulsion blended therein. Also, it has poor reactivity with primer inks, which gives rise to a need for more cohesion promoter.

BACKGROUND ART LITERATURE

Patent Literature

Patent Literature 1: Japanese Patent No. 4964165

SUMMARY OF THE INVENTION

Problems to Be Solved by the Invention

Accordingly, an object of the present invention is to improve the dispersion stability and discharge stability, while also improving the image quality and various resistance properties of printed matters even when the cohesion promoter contained in the primer ink is small in quantity Means for Solving the Problems As a result of studying in earnest to achieve the aforementioned object, the inventors of the present invention completed the present invention as an ink set comprising an inkjet printing ink that uses a pigment covered with a specific resin.

To be specific, the present invention is as follows:
1. An ink set comprising: an aqueous inkjet ink composition containing (a) a pigment, (b) a water-soluble organic solvent, (c) water, and (d) a resin emulsion, wherein the pigment (a) has a crosslinked resin layer on its surface; and a primer ink composition containing a cohesion promoter that promotes cohesion of the aforementioned ink composition.
2. An ink set according to 1, wherein the content of the cohesion promoter is 1 to 15 percent by mass in the primer ink composition.
3. An ink set according to 1, wherein the alkali-soluble resin constituting the crosslinked resin layer has an acid value of 40 to 300 KOHmg/g and a weight-average molecular weight of 10,000 to 100,000.
4. An ink set according to 1 or 2, wherein the alkali-soluble resin constituting the crosslinked resin layer has been neutralized with a hydroxide of an alkali metal.
5. An ink set according to any one of 1 to 3, wherein the alkali-soluble resin constituting the crosslinked resin layer contains, in its molecule, a constitutional unit derived from a stearyl(meth)acrylate and/or lauryl(meth)acrylate.
6. An ink set according to any one of 1 to 4, wherein the molecular weight of the crosslinking agent constituting the crosslinked resin layer is in a range of 100 to 20,000.
7. An ink set according to any one of 1 to 5, wherein the alkali-soluble resin constituting the crosslinked resin layer has been crosslinked by a range of 10 to 100 percent.
8. An ink set according to any one of 1 to 6, wherein the content of the water-soluble organic solvent (b) is 10 to 60 percent by mass in the aqueous inkjet ink composition.
9. An ink set according to any one of 1 to 7, wherein the solids content of the resin emulsion (d) is 1 to 15 percent by mass in the aqueous inkjet ink composition.

Effects of the Invention

The present invention can improve dispersion stability and discharge stability, while also improving image quality and various resistance properties of printed matters even when its primer ink contains only a small quantity of cohesion promoter.

MODE FOR CARRYING OUT THE INVENTION

The ink set proposed by the present invention is explained in detail below.
<Constitution of Ink Set>
The ink set proposed by the present invention basically comprises: an aqueous inkjet ink composition containing (a) a pigment, (b) a water-soluble organic solvent, (c) water, and (d) a resin emulsion, wherein the pigment (a) has a crosslinked resin layer on its surface; and a primer ink composition containing a cohesion promoter that promotes cohesion of the aforementioned ink composition.

The aqueous inkjet ink composition and primer ink composition are described below in this order.
<Aqueous Inkjet Ink Composition>
The aqueous inkjet ink composition under the present invention contains (a) a pigment, (b) a water-soluble organic solvent, (c) water, and (d) a resin emulsion.
(a) Pigment
The pigment used in the present invention is a pigment obtained by coating the surface of a pigment with an alkali-soluble resin and then treating the coated pigment with a bifunctional or polyfunctional crosslinking agent.

For the pigment used, any organic pigment and/or inorganic pigment conventionally used in inkjet ink compositions may be adopted. It should be noted that such pigment may be surface-treated beforehand using any known surface treatment agent.

The pigment may be, if organic pigment, a dye rake pigment or azo-, benzimidazolone-, phthalocyanine-, quinacridone-, anthraquinone-, dioxazine-, indigo-, thioindigo-, perylene-, perinone-, diketo-pyrrolo-pyrrole-, isoindolinone-, nitro-, nitroso-, anthraquinone-, flavanthrone-, quinophthalone-, pyranthrone-, or indanthrone-based pigment, etc., for example. If inorganic pigment, it may be carbon black, titanium oxide, red iron oxide, graphite, iron black, chromic oxide green, aluminum hydroxide, or the like.

Also, specific examples of pigments for the inkjet ink composition under the present invention are listed below by each representative hue.

First, yellow pigments for using the inkjet ink composition as a yellow inkjet ink composition include, for example, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc., among which C. I. Pigment Yellow 74, 150, 155, 180, 213, etc., are preferred.

Magenta pigments for using the inkjet ink composition as a magenta inkjet ink composition include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc., among which C. I. Pigment Red 122, 202, C. I. Pigment Violet 19, etc., are preferred.

Cyan pigments for using the inkjet ink composition as a cyan inkjet ink composition include, for example, C. I. Pigment Blue 1, 2, 3, 15, 15:1, 15:2, 15:3, 15:4, 15:6, 16, 18, 22, 27, 29, 60, etc., among which C. I. Pigment Blue 15:3, 15:4, etc., are preferred.

Black pigments for using the inkjet ink composition as a black inkjet ink composition include, for example, carbon black (C. I. Pigment Black 7), etc.

White pigments for using the inkjet ink composition as a white inkjet ink composition include, for example, titanium oxide, aluminum oxide, etc., among which titanium oxide that has been surface-treated with alumina, silica, or any of various other materials is preferred.

Preferably the content of pigment in the inkjet ink composition under the present invention, in a condition where the pigment surface is coated with a resin, is 1 to 20 percent by mass relative to the total quantity of inkjet ink composition. If the content of pigment is lower than 1 percent by mass, the image quality of the obtained printed matters tends to drop. If the content exceeds 20 percent by mass, on the other hand, viscosity properties of the inkjet ink composition tend to be negatively affected.

For the alkali-soluble resin with which to coat the pigment, any alkali-soluble resin satisfying one of (a) to (c) below may be used:
(a) the acid value of the alkali-soluble resin is 40 to 300 KOHmg/g;
(b) 50 to 90 percent of the acid groups in the alkali-soluble resin has been neutralized with a hydroxide of an alkali metal or other basic compound; or
(c) the alkali-soluble resin contains, as its constitutive monomer unit, a monomer containing lauryl(meth)acrylate and/or stearyl(meth)acrylate in such a way that it accounts for 20 to 40 percent by mass in the alkali-soluble resin, and also having an aromatic ring, or preferably a styrene monomer.

For such alkali-soluble resin, the following may be utilized, for example: a copolymer having a carboxyl group-containing monomer as a constitutional unit which is further polymerized with a monomer having lauryl(meth)acrylate and/or stearyl(meth)acrylate as well as an aromatic ring, to improve adsorptivity with the pigment; or a copolymer obtained by causing these monomers to react with other polymerizable monomers as necessary.

The aforementioned carboxyl group-containing monomer for making the resin soluble in alkalis may be, for example, acrylic acid, methacrylic acid, crotonic acid, itaconic acid, maleic acid, fumaric acid, 2-carboxy ethyl(meth)acrylate, 2-carboxy propyl(meth)acrylate, maleic acid anhydride, monoalkyl maleate ester, citraconic acid, citraconic acid anhydride, monoalkyl citraconate ester, etc.

Also, the aforementioned hydrophobic group-containing monomer for improving adsorptivity with the pigment may be styrene, α-styrene, vinyl toluene, or other styrene-based monomer, benzyl(meth)acrylate, etc., being a monomer having lauryl(meth)acrylate and/or stearyl(meth)acrylate as well as an aromatic ring. Here, a styrene-based monomer refers to a compound whose basic skeleton is styrene and which may also have an optional substitutional group. Preferably the alkali-soluble resin contains a monomer having an aromatic ring, or better yet a styrene-based monomer, by 30 to 60 percent by mass.

Preferably from the aspects of dispersion stability and solidification property, the alkali-soluble resin contains lauryl(meth)acrylate and/or stearyl(meth)acrylate by 20 to 40 percent by mass.

Also, other polymerizable monomers that can be used as necessary to the extent that performance does not drop, include methyl(meth)acrylate, ethyl(meth)acrylate, propyl (meth)acrylate, isopropyl(meth)acrylate, butyl(meth)acrylate, hexyl(meth)acrylate, and other (meth)acrylates, hydroxy ethyl(meth)acrylate, acrylamide, N-methylol acrylamide, 2-ethyl hexyl(meth)acrylate, octyl(meth)acrylate, 2-hydroxy stearyl(meth)acrylate, dodecyl vinyl ether, vinyl 2-ethyl hexanoate, vinyl laurate, vinyl stearate, cyclohexyl (meth)acrylate, benzyl(meth)acrylate, etc.

The acid value of the alkali-soluble resin is preferably 40 to 300 KOHmg, or more preferably 70 to 250 KOHmg/g. If the acid value of the alkali-soluble resin is lower than 40 KOHmg/g, dispersion stability of the obtained aqueous dispersion liquid of the pigment coated with the alkali-soluble resin may drop; if it is higher than 300 KOHmg/g, on the other hand, hydrophilicity may become too high, causing storage stability and water resistance to drop.

Preferably 50 to 90 percent of the acid groups in the alkali-soluble resin has been neutralized with a basic compound. Neutralizing less than 50 percent of them may cause dispersion stability to drop, while neutralizing more than 90 percent of them may cause storage stability and water resistance to drop.

The molecular weight of the alkali-soluble resin is preferably 10,000 to 100,000, or more preferably 10,000 to 50,000, based on weight-average molecular weight. If the weight-average molecular weight of the alkali-soluble resin is less than 10,000, dispersion stability of the pigment or abrasion resistance of the obtained printed matters tends to drop; if it exceeds 100,000, on the other hand, the viscosity will increase, which is not desirable.

Acid Value

Acid value (AV) is a theoretical acid value indicating the quantity of potassium hydroxide in milligrams theoretically needed to neutralize 1 gram of the alkali-soluble resin, which is calculated arithmetically based on the compositions of monomers used to synthesize the alkali-soluble resin.

Weight-Average Molecular Weight

Weight-average molecular weight can be measured by the gel permeation chromatography (GPC) method. As an example, it can be obtained as an equivalent weight-average molecular weight of polystyrene by performing chromatography using Waters 2690 (manufactured by Waters Corporation) as a GPC apparatus and PLgel 5 μm MIXED-D (manufactured by Polymer Laboratories Ltd.) as a column.

(Basic Compound)

The basic compound with which to neutralize the acid groups in the alkali-soluble resin may be sodium hydroxide, potassium hydroxide, or other inorganic basic compound, or ammonia, methylamine, ethylamine, monoethanolamine, N,N-dimethylethanolamine, N,N-diethylethanolamine, N,N-dibutylethanolamine, diethanolamine, N-methyldiethanolamine, triethanolamine, morpholine, N-methylmorpholine, N-ethylmorpholine, or other organic basic compound, and the like. Any of these basic compounds may be used alone, or two or more types may be combined. Among these, monoethanolamine, N,N-dimethylethanolamine, N,N-diethylethanolamine, N,N-dibutylethanolamine, diethanolamine, N-methyldiethanolamine, triethanolamine, or other alkanolamine is preferred in terms of pigment dispersion.

(Bifunctional or Polyfunctional Crosslinking Agent)

The bifunctional or polyfunctional crosslinking agent used in the manufacture of the coated pigment is used to crosslink the alkali-soluble resin to an appropriate degree. The crosslinking agent under the present invention is a crosslinking agent having two or more reactive functional groups, and the molecular weight of the crosslinking agent is preferably in a range of 100 to 20,000 from the viewpoints of ease of reaction and preservation stability.

Preferred examples of reactive functional groups include those of one or more types selected from the group consisting of epoxy groups, hydroxy groups, and aziridine groups. Among these, epoxy groups are preferred, and bifunctional epoxy groups are more preferred, from the viewpoints of viscosity and tolerance.

Specific examples of bifunctional or polyfunctional epoxy compounds include EPOLITE 40E, 100E, 200E, 400E, 70P, 200P, 400P, 1500NP, 1600, 80MF (manufactured by Kyoeisha Chemical Co., Ltd.), and DENACOL EX-201, EX-211, EX-212, EX-313, EX-314, EX-321, EX-411, EX-421, EX-512, EX-521, EX-611, EX-612, EX-614, EX-614B, EX-622 (manufactured by Nagase ChemteX Corporation), and the like.

(Pigment Coating Method)

As for the pigment under the present invention, the alkali-soluble resin whose acid groups have been neutralized with the basic compound is dissolved or dispersed together with the pigment in an aqueous solvent, after which this alkali-soluble resin is salted out or otherwise turned into an insolubilized resin and deposited onto the pigment surface. 50 to 90 percent of the acid groups in this deposited, insolubilized resin is neutralized. Once a dispersion liquid is obtained, in which the pigment coated with the obtained alkali-soluble resin is dispersed, the crosslinking agent is added to this dispersion liquid and then the mixture is heated, to crosslink the alkali-soluble resin coating the pigment surface and thereby obtain a coated pigment.

At this time, the obtained crosslinked alkali-soluble resin is such that the crosslinking ratio of the alkali-soluble resin relative to the theoretical acid value is 10 to 100 percent, or preferably 20 to 80 percent, or more preferably 30 to 70 percent, or yet more preferably 35 to 50 percent. If the crosslinking ratio is lower than 10 percent, the coating strength onto the pigment may not be sufficient.

(b) Water-soluble Organic Solvent, and (c) Water

For the water-soluble organic solvent used under the present invention, any water-soluble organic solvent conventionally used in aqueous inkjet ink compositions may be adopted. Also, for the water, an ion-exchanged water from which metallic ions, etc., have been removed, or distilled water is preferred.

By containing a water-soluble organic solvent, superior inkjet printability may be provided in terms of preservation stability, discharge stability, jetting property of ink, etc. The aforementioned water-soluble organic solvent may be, for example, any of alcohols, polyalcohols, lower alkyl ethers of polyalcohols, ketones, ethers, esters, nitrogen-containing compounds, amides, etc., where any one type of the foregoing may be used, or two or more types may be combined.

Specific examples of the aforementioned alcohols include methanol, ethanol, n-propanol, n-butanol, n-pentanol, n-hexanol, n-heptanol, n-octanol, n-nonyl alcohol, n-decanol, and isomers thereof, cyclopentanol, cyclohexanol, etc., among which alcohols with alkyl groups of carbon numbers 1 to 6 are preferred.

Specific examples of the aforementioned polyalcohols include glycerin, ethylene glycol, propylene glycol, 1,3-butylene glycol, 1,4-butylene glycol, 1,2-pentanediol, 4-methyl-1,2-pentanediol, 3,3-dimethyl-1,2-butanediol, 1,5-pentanediol, neopentyl glycol, 1,2-hexanediol, 2-ethyl-1,3-hexanediol, 2-methyl-1,3-butanediol, 5-methyl-1,2-hexanediol, 3-methyl-1,3-butanediol, 3-methyl-1,5-butanediol, 1,6-hexanediol, 1,2-cyclohexanediol, 2,2,4-trimethyl-1,3-pentanediol, 2,5-dimethyl-2,5-hexanediol, 1,2-octanediol, 1,8-octanediol, 1,9-nonanediol, 1,10-decanediol, pentaerythritol, diethylene glycol, dipropylene glycol, triethylene glycol, tetraethylene glycol, polyethylene glycol, polypropylene glycol, thiodiglycol, etc.

Specific examples of the aforementioned lower alkyl ethers of polyalcohols include ethylene glycol monomethyl ether, ethylene glycol dimethyl ether, ethylene glycol monoethyl ether, ethylene glycol diethyl ether, ethylene glycol monopropyl ether, ethylene glycol isopropyl ether, ethylene glycol monobutyl ether, ethylene glycol isobutyl ether, propylene glycol monomethyl ether, propylene glycol monoethyl ether, propylene glycol monopropyl ether, propylene glycol monobutyl ether, diethylene glycol monomethyl ether, diethylene glycol monoethyl ether, diethylene glycol monobutyl ether, dipropylene glycol mono-n-propyl ether, dipropylene glycol mono-n-butyl ether, etc.

The aforementioned ketones include, for example, acetone, methyl ethyl ketone, methyl butyl ketone, methyl isobutyl ketone, diisopropyl ketone, cyclopentanone, cyclohexanone, etc.

The aforementioned ethers include, for example, diethyl ether, isopropyl ether, n-butyl ether, tetrahydrofuran, tetrahydropyran, 1,4-dioxane, etc.

The aforementioned esters include, for example, ethyl acetate, propylene carbonate, methyl acetate, ethyl acetate, propyl acetate, isopropyl acetate, butyl acetate, isobutyl acetate, amyl acetate, lactic acid ester, butyric acid ester, dibutyl phthalate, dioctyl phthalate, ε-caprolactone, ε-caprolactam, or other cyclic ester.

The aforementioned nitrogen-containing compounds include 2-pyrrolidone, N-methyl pyrrolidone, N-ethyl pyrrolidone, N-methyl oxazolidinone, N-ethyl oxazolidinone, etc.

The aforementioned amides include ß-alkoxy propionamide, etc.

Any one type of these water-soluble organic solvents may be used, or two or more types may be combined.

Preferably the content of water-soluble organic solvent in the aqueous inkjet ink composition under the present invention is 10 to 60 percent by mass in the aqueous inkjet ink composition.

If the content of water-soluble organic solvent is lower than 10 percent by mass, the head is likely to experience clogged nozzles.

If it exceeds 60 percent by mass, on the other hand, increased viscosity of the ink tends to worsen its discharge property.

(d) Resin Emulsion

The resin emulsion may be an acrylic resin emulsion, styrene-acrylic resin emulsion, polyester resin emulsion, polyurethane resin emulsion, polyvinyl acetate resin emulsion, polyvinyl chloride resin emulsion, polybutadiene resin emulsion, polyethylene resin emulsion, etc. Among these, a styrene-acrylic resin emulsion is preferred as it will make the obtained printed matters excellent in terms of appearance and various resistance properties.

The content of resin emulsion, based on solids content, is preferably 1 to 15 percent by mass, or more preferably 2 to 8 percent by mass, in the aqueous inkjet ink composition.

If the content of resin emulsion is lower than 1 percent by mass based on solids content, the appearance and various resistance properties of the obtained printed matters tend to drop; if it exceeds 15 percent by mass, on the other hand, ink discharge tends to become unstable, which is not desirable.

(Surface Active Agent)

The aqueous inkjet ink composition under the present invention may contain a surface-active agent.

The surface-active agent may be a silicone surface-active agent, fluorine surface-active agent, acetylenic surface-active agent, etc. For instance, examples of acetylenic diol surface-active agents include DYNOL 607, DYNOL 609, EXP-4001, EXP-4300, OLFINE E1010 (manufactured by Nissin Chemical Industry Co., Ltd.), etc., examples of silicone surface-active agents include BYK-307, 333, 347, 348, 349, 345, 378, 3455 (manufactured by BYK-Chemie GmbH), etc., and examples of fluorine surface-active agents include F-410, 444, 553 (manufactured by DIC Corporation), FS-65, 34, 35, 31, 30 (manufactured by DuPont de Nemours, Inc.), etc.

The content of the aforementioned surface-active agent, which only needs to be such that the aqueous inkjet ink composition will produce 25 to 40 mN/m of surface tension, is 0.1 to 1.5 percent by mass in the aqueous inkjet ink composition.

(Other Additives)

Furthermore, the aqueous inkjet ink composition under the present invention may contain known additives, such as antifungal agent, rustproof agent, thickening agent, antioxidant, UV absorbent, storability-improving agent, defoaming agent, moisturizing agent and pH-adjusting agent, depending on its purpose.

[Method for Manufacturing Aqueous Inkjet Ink Composition]

The method for manufacturing an aqueous inkjet ink composition using the above constitutive components may be one, for example, whereby: an aqueous resin varnish prepared by dissolving the alkali-soluble resin in water in the presence of the pigment and basic compound, is mixed with a pigment dispersant, etc., as necessary; after which any of various types of dispersion machines, such as a ball mill, attritor, roll mill, sand mill, agitator mill, etc., is utilized to disperse the pigment; after which the acid precipitation method, ion exchange means described in International Patent Laid-open No. 2005/116147, phase inversion emulsification method, etc., is used to obtain a pigment with the alkali-soluble resin precipitated on its surface; next, the obtained pigment with the alkali-soluble resin precipitated on its surface is treated with the basic compound to neutralize 50 to 90 percent of the acid groups in the alkali-soluble resin, and then dispersed again in water using any of various types of dispersion machines (high-speed agitator, etc.); next, the bifunctional or polyfunctional crosslinking agent is added, the mixture is heated at 50 to 80° C. to cause crosslinking, and the remaining materials are added further, to prepare an aqueous inkjet ink composition.

The thus-obtained aqueous inkjet ink composition under the present invention, as manufactured, shall have an initial viscosity in a range of 3.0 to 15.0 mPa·s and a static surface tension in a range of 25 to 40 mN/m.

<Primer Ink Composition>

The primer ink composition under the present invention contains (e) a cohesion promoter, and may further contain, optionally, (f) a resin emulsion, (g) a hydrazine compound, and/or (h) a surface-active agent.

(e) Cohesion Promoter

The cohesion promoter (e) may be a water-soluble multivalent metal salt, organic acid, cationic polymer, etc.

Examples of water-soluble multivalent metal salts include dissociative salts of Ca, Mg, and other alkali earth metals. Specific examples include calcium nitrate, $CaCl_2$, $Ca(OH)_2$, $(CH_3COO)_2Ca$, $MgCl_2$, $Mg(OH)_2$, $(CH_3COO)_2Mg$, $(HCOO)_2Ca$, $MgSO_4$, etc. Among these, the water-soluble multivalent metal salt is preferably a calcium salt, or more preferably calcium nitrate, $CaCl_2$, $Ca(OH)_2$, $(CH_3COO)_2Ca$, $(HCOO)_2Ca$, etc. Examples of organic acids include lactic acid, malic acid, citric acid, oxalic acid, malonic acid, acetic acid, propionic acid, fumaric acid, etc.

Examples of cationic polymers include polymers having primary, secondary or tertiary amino groups or quaternary ammonium salt groups as cationic groups. Specific examples include homopolymers constituted by monomers (cationic monomers) having primary, secondary, or tertiary amino groups or salts thereof or quaternary ammonium salt groups, as well as copolymers or condensation polymers constituted by such cationic monomers and other monomers (hereinafter referred to as "noncationic monomers"). Cationic polymers may be used in either a water-soluble polymer form or water-dispersed latex grain form. It should be noted that one type of cationic polymer may be used alone, or two or more types may be combined.

The content of cohesion promoter is not limited in any way. As an example, the content of cohesion promoter is preferably 1 percent by mass or higher, based on equivalent solids content in the primer ink composition. The content of cohesion promoter is preferably 15 percent by mass or lower, or more preferably 10 percent by mass or lower, based on equivalent solids content in the primer ink composition. If the content of cohesion promoter is lower than 1 percent by mass, the obtained printed matters will likely have lower sharpness and bleed resistance. If the content of cohesion promoter exceeds 15 percent by mass, on the other hand, the obtained printed matters will likely have lower water resistance.

(f) Resin Emulsion

For the resin emulsion contained in the primer ink composition, any of the resin emulsions cited as examples for the aforementioned inkjet ink composition may be used. In particular, an acrylic resin emulsion, vinyl acetate resin emulsion, or styrene-acrylic resin emulsion is preferred. If a chlorinated polyolefin resin emulsion is used, preferably the chlorination level is 15 to 30 percent.

A chlorinated polyolefin resin emulsion is a polyolefin resin that has been chlorinated and then emulsified. Examples of chlorinated polyolefin resins include chlorinated polypropylene resins, chlorinated polyethylene resins, etc. In this embodiment, a chlorinated polyolefin resin emulsion having good stability even in the presence of a water-soluble multivalent metal salt, is used.

The chlorine content in the chlorinated polyolefin resin is not limited in any way. As an example, the chlorine content is preferably 1 percent by mass or higher, or more preferably 10 percent by mass or higher, relative to the resin as a whole. Also, the chlorine content is preferably 40 percent by mass or lower, or more preferably 30 percent by mass or lower. Meanwhile, if the chlorine content exceeds 40 percent by mass, the primer ink composition will likely have lower adhesion to polyolefin and other nonpolar films.

Among the acrylic resin emulsions, those having good stability even in the presence of a cohesion promoter are preferred. Examples of acrylic resin emulsions include acrylic emulsion, styrene-acrylic resin emulsions, acrylic-vinyl acetate resin emulsions, acrylic-vinyl chloride resin emulsions, acrylic-silicone resin emulsions, acrylic-colloidal silica resin emulsions, etc. Among these, styrene-acrylic resin emulsions with a glass transition temperature of 0° C. or below are more preferred.

As the vinyl acetate resin emulsions, those having good stability even in the presence of a cohesion promoter are preferred. Among there, vinyl acetate resin emulsions with a glass transition temperature of 0 to 50° C. are more preferred as they provide good adhesion to recording media.

The content of resin emulsion (f) is not limited in any way. As an example, the content of resin emulsion is preferably 0.5 percent by mass or higher, or more preferably 1 percent by mass or higher, based on equivalent solids content in the primer ink composition. Also, the content of resin emulsion is preferably 10 percent by mass or lower, or more preferably 5 percent by mass or lower, based on equivalent solids content in the primer ink composition. If the content is lower than 0.5 percent by mass, the primer ink composition will likely have lower adhesion to the base material. If it exceeds 10 percent by mass, on the other hand, the primer ink composition will likely have lower preservation stability.

(g) Hydrazine Compound

The primer ink composition under the present invention may contain a hydrazine compound having at least two hydrazine residues. Such hydrazine compound may be, for example, oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide, etc.

Such hydrazine compound, if contained in the primer ink composition, may be contained by 0.2 to 5.0 percent by mass.

(h) Surface-Active Agent

As for surface-active agents, those similar to the aforementioned various surface-active agents that can be blended into the aqueous inkjet ink composition, may be blended in.

Other Optional Components

Optional components, other than the aforementioned components, may be blended in the primer ink composition as necessary. Examples of optional components include water-soluble organic solvents and various additives. Examples of additives include surface-active agent, storability-improving agent, defoaming agent, etc.

Examples of water-soluble organic solvents include monoalcohols, polyalcohols, lower alkyl ethers of polyalcohols, ketones, ethers, esters, nitrogen-containing compounds, etc. These may be used in combination. It should be noted that, from the viewpoint of drying property of the obtained primer layer, preferably no water-soluble organic solvent is used.

Examples of storability-improving agent include hindered amines, UV absorbents, antioxidants, etc. Examples of hindered amines include the N—CH$_3$ type, N—H type, N—OR type, etc. Examples of UV absorbents include benzophenone UV absorbents, benzotriazole UV absorbents, salicylate UV absorbents, hydroxyphenyl triazine UV absorbents, cyanoacrylate UV absorbents, nickel complex salt UV absorbents, etc. Examples of antioxidants include phenol antioxidants, amine antioxidants, sulfur antioxidants, phosphorus antioxidants, etc. Examples of defoaming agents include silicone defoaming agents, pluronic defoaming agents, etc.

Manufacturing of Primer Ink Composition

The primer ink composition can be manufactured by adding, to water, (e) a cohesion promoter and, if necessary, (f) a resin emulsion, (g) a hydrazine compound, (h) a surface-active agent, a water-soluble organic solvent, and various additives, and then mixing them under agitation using a disperser, etc.

The above primer ink composition has excellent preservation stability. Also, providing a primer layer constituted by this inkjet primer ink composition on a recording medium made of a plastic film, improves the adhesion, bleed property, and water resistance of images printed with the inkjet ink composition.

EXAMPLES

Examples 1 to 14 and Comparative Examples 1 to 11

The present invention is explained in greater detail below using examples; however, the present invention is not limited to these examples. It should be noted that, unless otherwise specified, "%" means "percent by mass," while "part" means "part by mass."

Primer ink compositions were obtained by mixing the components listed in Table 1, while respective black ink compositions were obtained by mixing the components listed in Table 2.

The following items were tested on these primer ink compositions and black ink compositions, and by also using these ink compositions.

[Viscosity Stability Evaluation of Pigment Dispersion Liquids and Inks]

The pigment dispersion liquids used in the examples and comparative examples, as well as the black ink compositions prepared therein, were each put in a glass vial and measured for viscosity at 25° C. using a viscometer (Model RE100L, manufactured by Toki Sangyo Co., Ltd.). Thereafter, the vials were sealed hermetically and preserved at 60° C. for 1 month, and then measured for post-preservation viscosity (25° C.) with the viscometer. Stability was evaluated based on the rate of change in viscosity (Viscosity after 1 month at 60° C.—Pre-preservation viscosity/Pre-preservation viscosity).

Evaluation Criteria

○: The rate of change in viscosity is lower than 10%.

Δ: The rate of change in viscosity is 10% or higher, but lower than 15%.

x: The rate of change in viscosity is 15% or higher.

[Grain Size Stability Evaluation of Pigment Dispersion Liquids and Inks]

The pigment dispersion liquids used in the examples and comparative examples, as well as the black ink compositions prepared therein, were each put in a glass vial and measured for grain size D50 using a granularity distribution meter. Thereafter, the vials were sealed hermetically and preserved at 60° C. for 1 month, and then measured for post-preservation grain size D50 with the granularity distribution meter. Stability was evaluated based on the rate of change in grain size (Grain size D50 after 1 month at 60° C.—Pre-preservation grain size D50/Pre-preservation grain size D50).

Evaluation Criteria
○: The rate of change in grain size D50 is lower than 10%.
Δ: The rate of change in grain size D50 is 10% or higher, but lower than 15%.
x: The rate of change in grain size D50 is 15% or higher.

[Sedimentation Stability Evaluation of Pigment Dispersion Liquids]

The pigment dispersion liquids used in the examples and comparative examples were each taken by 20 mL and put in a glass vial (approx. 20 mL in capacity), after which the vials were sealed hermetically and preserved at 60° C. for 1 week; thereafter, the thus-preserved pigment dispersion liquids were visually observed and evaluated for pigment sedimentation property.

Evaluation Criteria
○: In the pigment dispersion liquid inside the glass vial, the pigment is not seen sedimented at the bottom of the container.
Δ: In the pigment dispersion liquid inside the glass vial, the pigment is seen sedimented at the bottom of the container, but the sediment will disappear after the glass vial is shaken three times.
x: In the pigment dispersion liquid inside the glass vial, the pigment is seen sedimented at the bottom of the container, and the sediment will not disappear after the glass vial is shaken three times.

[Evaluation of Discharge Property (Ink Discharge Property)]

The aqueous inks prepared in the examples and comparative examples were filled in the cartridges for Epson's PX105 printer and text was printed on GL-101A450 photographic papers (manufactured by Canon Inc.), and evaluated for discharge stability.

Evaluation Criteria
○: There are no printing irregularities and the ink can be discharged stably.
Δ: There are some printing irregularities, but the ink is discharged.
x: There are printing irregularities and the ink cannot be discharged stably.

[Evaluation of Printed Image Quality]

The black ink compositions prepared in the examples and comparative examples were filled in the cartridges for Epson's PX105 printer and thin lines of approx. 0.3 mm were printed on OK Top Coat papers (manufactured by Oji Paper Co., Ltd.) over which a primer had been spread and fixed using a 0.1-mm bar coater, the results of which were then observed for thickening caused by bleeding to evaluate the printed image quality.

Evaluation Criteria
○: On the printed matter, the lines are free of bleeding and maintain the original thickness as printed.
Δ: On the printed matter, the lines have thickened in some areas, but thickening by twice or more is not observed.
x: On the printed matter, thickening by twice or more is observed all around.

[Evaluation of Water Resistance]

The black ink compositions prepared in the examples and comparative examples were filled in the cartridges for Epson's PX105 printer and text was printed on OK Top Coat papers (manufactured by Oji Paper Co., Ltd.) over which a primer had been spread and fixed using a 0.1-mm bar coater, after which the printed areas were rubbed 20 times using moistened cotton swabs and then the printed matters were observed and evaluated for water resistance based on the criteria below.

Evaluation Criteria
○: The printing is not blurred.
Δ: The printing is slightly blurred, but the text is clearly legible.
x: The printing is blurred and the text is illegible.

TABLE 1

| | | Primers | | | | | | | | |
|---|---|---|---|---|---|---|---|---|---|---|
| | | P1 | P2 | P3 | P4 | P5 | P6 | P7 | P8 | P9 |
| (e) Cohesion promoter (solids content) | Citric acid | 15.0 | 10.0 | — | — | — | — | — | — | — |
| | Calcium acetate | — | — | 2.0 | 2.0 | 2.0 | 2.0 | — | — | — |
| | Calcium nitrate | — | — | — | — | — | — | 10.0 | — | — |
| | Calcium chloride | — | — | — | — | — | — | — | 5.0 | — |
| | P-105 | — | — | — | — | — | — | — | — | 3.0 |
| (f) Resin emulsion (solids content) | Chlorinated polyolefin (chlorination level 21%) | — | — | 2.0 | — | — | — | — | — | — |
| | Acrylic | — | — | — | 2.0 | — | — | — | — | — |
| | Vinyl acetate | — | — | — | — | 2.0 | — | — | — | — |
| | Styrene acrylic | — | — | — | — | — | — | 5.0 | 5.0 | — |
| (g) Hydrazine derivative having at least 2 hydrazine residues (solids content) | Adipic acid dihydrazide | — | — | — | — | — | 2.0 | — | — | — |

TABLE 1-continued

|  |  | Primers | | | | | | | | |
|---|---|---|---|---|---|---|---|---|---|---|
|  |  | P1 | P2 | P3 | P4 | P5 | P6 | P7 | P8 | P9 |
| Water |  | 84.5 | 89.5 | 95.5 | 95.5 | 95.5 | 95.5 | 84.5 | 89.5 | 96.5 |
| (h) Surface-active agent | OLFINE E1010 | 0.5 | 0.5 | 0.5 | 0.5 | 0.5 | 0.5 | 0.5 | 0.5 | 0.5 |
| Total |  | 100.0 | 100.0 | 100.0 | 100.0 | 100.0 | 100.0 | 100.0 | 100.0 | 100.0 |

P-105: Polymer of quaternary ammonium salt (manufactured by SENKA Corporation)

(Methods for Preparing Pigment Dispersion Liquids)
(Water-Soluble Rein Varnish A)

Twenty-five parts by mass of an acrylic acid/stearyl acrylate/styrene (25/40/35) copolymer of 23,000 in weight-average molecular weight and 185 KOHmg/g in acid value, were dissolved in a liquid mixed from 4.9 parts by mass of potassium hydroxide and 70.1 parts by mass of water, to obtain water-soluble resin varnish A of 25% in solids content.

(Water-Soluble Resin Varnish B)

Twenty-five parts by mass of an acrylic acid/lauryl acrylate/styrene (25/40/35) copolymer of 23,000 in weight-average molecular weight and 185 KOHmg/g in acid value, were dissolved in a liquid mixed from 4.9 parts by mass of potassium hydroxide and 70.1 parts by mass of water, to obtain water-soluble resin varnish B of 25% in solids content.

(Aqueous Black Pigment Dispersion Liquid α)

Forty-eight parts by mass of water were added to and mixed with 32 parts by mass of water-soluble resin varnish A (solids content 25%) above, to prepare a resin varnish for pigment dispersion. Twenty parts by mass of carbon black (product name PRINTEX 90, manufactured by Degussa AG (currently Orion Engineered Carbons S. A.) were further added to and mixed under agitation with this varnish and then the mixture was kneaded in a wet circulation mill, to prepare aqueous black pigment dispersion liquid α.

(Aqueous Black Pigment Dispersion Liquid 1)

Water was added to aqueous black pigment dispersion liquid α above to a pigment concentration of 15%, to prepare aqueous black pigment dispersion liquid 1.

(Aqueous Black Pigment Dispersion Liquid 2 (Crosslinking Step))

To 75 parts by mass of aqueous black pigment dispersion liquid 1 above, 2.1 parts by mass of EPOLITE 1600 (bifunctional epoxy compound, manufactured by Kyoeisha Chemical Co., Ltd.) and 22.9 parts by mass of water were added and the mixture was heated at 60° C. for 24 hours, to obtain aqueous black pigment dispersion liquid 2.

(Aqueous Black Pigment Dispersion Liquid ß (Coating Step))

Aqueous black pigment dispersion liquid α above was diluted with water to a pigment concentration of 5%, after which a cation-exchange resin (DOWEX MONOSPHERE (H) 650C, manufactured by Dow Chemical Company) was added by 5% relative to the diluted liquid, and the mixture was agitated to exchange ions until the pH dropped to below 4, to obtain each resin-coated pigment. Thereafter, the ion-exchange resin was filtered out with a mesh and then suction-filtered, to obtain a hydrous cake (solids content 25%) containing each resin-coated pigment. Enough sodium hydroxide to neutralize 65% of the acid groups in the alkali-soluble resin, and enough water to achieve a pigment concentration of 16%, were added to this resin-coated pigment-containing hydrous cake, after which the mixture was agitated in the high-pressure emulsion dispersion apparatus Gaulin Homogenizer (manufactured by A. P. V. GAULIN INC.), to obtain aqueous black pigment dispersion liquid ß.

(Aqueous Black Pigment Dispersion Liquid 3)

Water was added to aqueous black pigment dispersion liquid ß above to a pigment concentration of 15%, to prepare aqueous black pigment dispersion liquid 3.

(Aqueous Black Pigment Dispersion Liquid 4 (Crosslinking Step))

To 93.8 parts by mass of aqueous black pigment dispersion liquid ß above, 2.1 parts by mass of EPOLITE 1600 (bifunctional epoxy compound, manufactured by Kyoeisha Chemical Co., Ltd.) and 4.1 parts by mass of water were added and the mixture was heated at 60° C. for 24 hours, to obtain aqueous black pigment dispersion liquid 4.

(Aqueous Black Pigment Dispersion Liquids 5 to 8)

Aqueous black pigment dispersion liquids 5 to 8 were obtained according to the same method, except that the water-soluble resin varnish used in aqueous black pigment dispersion liquid α above was changed to water-soluble resin varnish B.

Aqueous inkjet ink compositions were obtained by using the respective aqueous black pigment dispersion liquids, and also adding the water-soluble solvent, resin emulsion, surface-active agent and water, as listed in Table 2 below.

Using the respective primers listed in Table 1 above according to the combinations in Table 2, printing was performed with the aqueous inkjet ink compositions.

The results were tested for the aforementioned test items. The test results are shown in Table 2.

TABLE 2

|  |  | Examples | | | | | | | | | | | | | |
|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 |
| (a) Pigment dispersion liquid | Aqueous black pigment dispersion liquid | 4 | 4 | 4 | 4 | 4 | 8 | 4 | 4 | 4 | 4 | 4 | 4 | 4 | 4 |

TABLE 2-continued

|  |  |  |  |  |  |  |  |  |  |  |  |  |  |  |
|---|---|---|---|---|---|---|---|---|---|---|---|---|---|---|
|  | Coating step | Yes | Yes | Yes | Yes | Yes | Yes | Yes | Yes | Yes | Yes | Yes | Yes | Yes | Yes |
|  | Crosslinking step | Yes | Yes | Yes | Yes | Yes | Yes | Yes | Yes | Yes | Yes | Yes | Yes | Yes | Yes |
|  | Type and use quantity of alkali-soluble resin | STA 27.0 | STA 27.0 | STA 27.0 | STA 27.0 | STA 27.0 | LA 27.0 | STA 27.0 | STA 27.0 | STA 27.0 | STA 27.0 | STA 27.0 | STA 27.0 | STA 27.0 | STA 27.0 |
| (b) Water-soluble solvent | Propylene glycol | 30.0 | 35.0 | 20.0 | 20.0 | 55.0 | 30.0 | 30.0 | 30.0 | 30.0 | 30.0 | 30.0 | 30.0 | 30.0 | 30.0 |
| (d) Resin emulsion (solids content) | YODOSOL AD199 | 5.0 | 1.0 | 15.0 | 5.0 | 5.0 | 5.0 | 5.0 | 5.0 | 5.0 | 5.0 | 5.0 | 5.0 | 5.0 | 5.0 |
| Surface-active agent | OLFINE E1010 | 1.0 | 1.0 | 1.0 | 1.0 | 1.0 | 1.0 | 1.0 | 1.0 | 1.0 | 1.0 | 1.0 | 1.0 | 1.0 | 1.0 |
| (c) Water |  | 37.0 | 36.0 | 37.0 | 47.0 | 12.0 | 37.0 | 37.0 | 37.0 | 37.0 | 37.0 | 37.0 | 37.0 | 37.0 | 37.0 |
| Total |  | 100 | 100 | 100 | 100 | 100 | 100 | 100 | 100 | 100 | 100 | 100 | 100 | 100 | 100 |
| Primer used |  | P1 | P1 | P1 | P1 | P1 | P1 | P2 | P3 | P4 | P5 | P6 | P7 | P8 | P9 |
| Viscosity (mPa · s) at 25° C. |  | 5 | 5 | 5 | 3 | 15 | 5 | 5 | 5 | 5 | 5 | 5 | 5 | 5 | 5 |
| Viscosity stability of pigment dispersion liquid |  | ○ | ○ | ○ | ○ | ○ | ○ | ○ | ○ | ○ | ○ | ○ | ○ | ○ | ○ |
| Grain size stability of pigment dispersion liquid |  | ○ | ○ | ○ | ○ | ○ | ○ | ○ | ○ | ○ | ○ | ○ | ○ | ○ | ○ |
| Sedimentation stability of pigment dispersion liquid |  | ○ | ○ | ○ | ○ | ○ | ○ | ○ | ○ | ○ | ○ | ○ | ○ | ○ | ○ |
| Viscosity stability of ink |  | ○ | ○ | ○ | ○ | ○ | ○ | ○ | ○ | ○ | ○ | ○ | ○ | ○ | ○ |
| Grain size stability of ink |  | ○ | ○ | ○ | ○ | ○ | ○ | ○ | ○ | ○ | ○ | ○ | ○ | ○ | ○ |
| Discharge properly |  | ○ | ○ | Δ | ○ | Δ | ○ | ○ | ○ | ○ | ○ | ○ | ○ | ○ | ○ |
| Printed image quality |  | ○ | ○ | ○ | ○ | ○ | ○ | ○ | ○ | ○ | ○ | ○ | ○ | ○ | ○ |
| Water resistance |  | Δ | Δ | Δ | Δ | Δ | Δ | ○ | ○ | ○ | ○ | ○ | ○ | ○ | ○ |

|  |  | Comparative Examples |  |  |  |  |  |  |  |  |  |  |
|---|---|---|---|---|---|---|---|---|---|---|---|---|
|  |  | 1 | 2 | 3 | 4 | 5 | 6 | 7 | 8 | 9 | 10 | 11 |
| (a) Pigment dispersion liquid | Aqueous black pigment dispersion liquid | 4 | 1 | 5 | 2 | 2 | 6 | 6 | 3 | 3 | 7 | 7 |
|  | Coating step | Yes | No | No | No | No | No | No | Yes | Yes | Yes | Yes |
|  | Crosslinking step | Yes | No | No | Yes | Yes | Yes | Yes | No | No | No | No |
|  | Type and use quantity of alkali-soluble resin | STA 27.0 | STA 27.0 | LA 27.0 | STA 27.0 | STA 27.0 | LA 27.0 | LA 27.0 | STA 27.0 | STA 27.0 | LA 27.0 | LA 27.0 |
| (b) Water-soluble solvent | Propylene glycol | 30.0 | 30.0 | 30.0 | 30.0 | 30.0 | 30.0 | 30.0 | 30.0 | 30.0 | 30.0 | 30.0 |
| (d) Resin emulsion (solids content) | YODOSOL AD199 | 5.0 | 5.0 | 5.0 | 5.0 | 5.0 | 5.0 | 5.0 | 5.0 | 5.0 | 5.0 | 5.0 |
| Surface-active agent | OLFINE E1010 | 1.0 | 1.0 | 1.0 | 1.0 | 1.0 | 1.0 | 1.0 | 1.0 | 1.0 | 1.0 | 1.0 |
| (c) Water |  | 37.0 | 37.0 | 37.0 | 37.0 | 37.0 | 37.0 | 37.0 | 37.0 | 37.0 | 37.0 | 37.0 |
| Total |  | 100 | 100 | 100 | 100 | 100 | 100 | 100 | 100 | 100 | 100 | 100 |
| Primer used |  | None | P1 | P1 | P1 | P1 | P1 | P1 | P1 | P1 | P1 | P1 |
| Viscosity (mPa · s) at 25° C. |  | 5 | 7 | 7 | 8 | 8 | 8 | 8 | 5 | 5 | 5 | 5 |
| Viscosity stability of pigment dispersion liquid |  | ○ | x | x | x | x | x | x | Δ | Δ | Δ | Δ |
| Grain size stability of pigment dispersion liquid |  | ○ | x | x | x | x | x | x | Δ | Δ | Δ | Δ |
| Sedimentation stability of pigment dispersion liquid |  | ○ | x | x | x | x | x | x | x | x | x | x |
| Viscosity stability of ink |  | ○ | x | x | Δ | Δ | Δ | Δ | ○ | ○ | ○ | ○ |
| Grain size stability of ink |  | ○ | x | x | Δ | Δ | Δ | Δ | ○ | ○ | ○ | ○ |

TABLE 2-continued

| | | | | | | | | | | | |
|---|---|---|---|---|---|---|---|---|---|---|---|
| Discharge properly | o | x | x | Δ | Δ | Δ | Δ | o | o | o | o |
| Printed image quality | x | — | — | o | Δ | o | Δ | o | Δ | o | Δ |
| Water resistance | o | — | — | x | Δ | x | Δ | x | Δ | x | Δ |

STA: Stearyl(meth)acrylate-containing resin
LA: Lauryl(meth)acrylate-containing resin Examples 1 to 14 produced excellent results under the respective test items. In particular, Examples 7 to 14 produced excellent results in terms of water resistance.

Meanwhile, Comparative Example 1 that did not use a primer failed to demonstrate good printed image quality. Also, Comparative Examples 2 to 7 that used an aqueous inkjet ink composition whose pigment was not coated with resin, had poorer levels of viscosity stability, grain size stability, and sedimentation stability of pigment dispersion liquid, as well as poorer levels of viscosity stability of ink, grain size stability of ink, discharge property, and water resistance. Furthermore, Comparative Examples 8 to 11 whose pigment was coated with resin but not crosslinked, had poorer levels of viscosity stability, grain size stability, sedimentation stability of pigment dispersion ink, and water resistance.

What is claimed is:

1. An ink set, comprising:
    an aqueous inkjet ink composition containing (a) a pigment, (b) a water-soluble organic solvent, (c) water, and (d) a resin emulsion, wherein the pigment (a) has, on its surface, a crosslinked resin layer constituted by a crosslinked alkali-soluble resin that contains, in its molecule, a stearyl(meth)acrylate- and/or lauryl(meth)acrylate-derived constitutional unit; and
    a primer ink composition, wherein a cohesion promoter that promotes cohesion of the aqueous inkjet ink composition is contained only in the primer ink composition and a content of the cohesion promoter in the primer ink composition is 1 to 10 percent by mass.

2. The ink set according to claim 1, wherein a content of the water-soluble organic solvent (b) is 10 to 60 percent by mass in the aqueous inkjet ink composition.

3. The ink set according to claim 1, wherein a solids content of the resin emulsion (d) is 1 to 15 percent by mass in the aqueous inkjet ink composition.

4. The ink set according to claim 1, wherein the alkali-soluble resin constituting the crosslinked resin layer has been crosslinked by a range of 10 to 100 percent.

5. The ink set according to claim 4, wherein a content of the water-soluble organic solvent (b) is 10 to 60 percent by mass in the aqueous inkjet ink composition.

6. The ink set according to claim 1, wherein a molecular weight of the crosslinking agent constituting the crosslinked resin layer is in a range of 100 to 20,000.

7. The ink set according to claim 6, wherein the alkali-soluble resin constituting the crosslinked resin layer has been crosslinked by a range of 10 to 100 percent.

8. The ink set according to claim 6, wherein a content of the water-soluble organic solvent (b) is 10 to 60 percent by mass in the aqueous inkjet ink composition.

9. The ink set according to claim 6, wherein a solids content of the resin emulsion (d) is 1 to 15 percent by mass in the aqueous inkjet ink composition.

10. The ink set according to claim 1, wherein the alkali-soluble resin constituting the crosslinked resin layer has been neutralized with a hydroxide of an alkali metal.

11. The ink set according to claim 10, wherein a molecular weight of the crosslinking agent constituting the crosslinked resin layer is in a range of 100 to 20,000.

12. The ink set according to claim 10, wherein the alkali-soluble resin constituting the crosslinked resin layer has been crosslinked by a range of 10 to 100 percent.

13. The ink set according to claim 10, wherein a content of the water-soluble organic solvent (b) is 10 to 60 percent by mass in the aqueous inkjet ink composition.

14. The ink set according to claim 10, wherein a solids content of the resin emulsion (d) is 1 to 15 percent by mass in the aqueous inkjet ink composition.

15. The ink set according to claim 1, wherein the alkali-soluble resin constituting the crosslinked resin layer has an acid value of 40 to 300 KOHmg/g and a weight-average molecular weight of 10,000 to 100,000.

16. The ink set according to claim 15, wherein the alkali-soluble resin constituting the crosslinked resin layer has been neutralized with a hydroxide of an alkali metal.

17. The ink set according to claim 15, wherein a molecular weight of the crosslinking agent constituting the crosslinked resin layer is in a range of 100 to 20,000.

18. The ink set according to claim 15, wherein the alkali-soluble resin constituting the crosslinked resin layer has been crosslinked by a range of 10 to 100 percent.

19. The ink set according to claim 15, wherein a content of the water-soluble organic solvent (b) is 10 to 60 percent by mass in the aqueous inkjet ink composition.

20. The ink set according to claim 15, wherein a solids content of the resin emulsion (d) is 1 to 15 percent by mass in the aqueous inkjet ink composition.

* * * * *